(12) United States Patent
Ukita et al.

(10) Patent No.: US 8,870,221 B2
(45) Date of Patent: Oct. 28, 2014

(54) GAS GENERATOR

(71) Applicant: Daicel Corporation, Osaka (JP)

(72) Inventors: Shinichiro Ukita, Tatsuno (JP); Naoki Matsuda, Tatsuno (JP)

(73) Assignee: Daicel Corporation, Osaka-Shi (JP)

( * ) Notice: Subject to any disclaimer, the term of this patent is extended or adjusted under 35 U.S.C. 154(b) by 0 days.

(21) Appl. No.: 13/900,348

(22) Filed: May 22, 2013

(65) Prior Publication Data

US 2013/0312632 A1 Nov. 28, 2013

Related U.S. Application Data

(60) Provisional application No. 61/651,791, filed on May 25, 2012.

(30) Foreign Application Priority Data

May 23, 2012 (JP) ................................ 2012-117375

(51) Int. Cl.
*B60R 21/26* (2011.01)
*B60R 21/264* (2006.01)
*C06D 5/00* (2006.01)

(52) U.S. Cl.
CPC .............. *C06D 5/00* (2013.01); *B60R 21/2644* (2013.01); *B60R 2021/2648* (2013.01)
USPC ......................................... 280/736; 102/530

(58) Field of Classification Search
CPC ........ C06D 5/00; B60R 21/26; B60R 21/264; B60R 21/2644; B60R 21/2646; B60R 2021/2648
USPC ................................................ 280/736, 741
See application file for complete search history.

(56) References Cited

U.S. PATENT DOCUMENTS

| | | | |
|---|---|---|---|
| 6,189,924 B1 * | 2/2001 | Hock | 280/736 |
| 6,709,012 B1 * | 3/2004 | Tanaka et al. | 280/736 |
| 6,899,351 B2 * | 5/2005 | Saso et al. | 280/736 |
| 6,929,284 B1 * | 8/2005 | Saso et al. | 280/741 |

(Continued)

FOREIGN PATENT DOCUMENTS

| | | |
|---|---|---|
| EP | 1 671 856 A1 | 6/2006 |
| JP | 2006-168670 A | 6/2006 |

OTHER PUBLICATIONS

International Search Report and Written Opinion issued in International Application No. PCT/JP2013/063874 on Aug. 21, 2013.

*Primary Examiner* — Paul N Dickson
*Assistant Examiner* — Timothy Wilhelm
(74) *Attorney, Agent, or Firm* — Birch, Stewart, Kolasch & Birch, LLP

(57) ABSTRACT

The present invention provides a gas generator including:
a housing including an inner cylindrical member for defining an ignition chamber therein,
a first combustion chamber and a second combustion chamber provided outside the inner cylindrical member and being charged with the first and second gas generating agents, respectively,
a plenum chamber located between the first combustion chamber and the second combustion chamber and being defined by the partition member,
a first communication nozzle and a second communication nozzle provided in the inner cylindrical member,
an axial position of the first communication nozzle being adjusted to be farther away from the plenum chamber than an axial position of the second communication nozzle, a first gas generating agent to be burn up earlier than a second gas generating agent.

7 Claims, 3 Drawing Sheets

(56) References Cited

U.S. PATENT DOCUMENTS

| | | | |
|---|---|---|---|
| 7,520,530 B2 * | 4/2009 | Yamazaki | 280/736 |
| 7,954,848 B2 * | 6/2011 | Hayakawa et al. | 280/736 |
| 2003/0137139 A1 | 7/2003 | Iwai et al. | |
| 2010/0253053 A1 | 10/2010 | Hayakawa et al. | |

* cited by examiner

US 8,870,221 B2

GAS GENERATOR

This nonprovisional application claims priority under 35 U.S.C. §119(a) to Patent Application No. 2012-117375 filed in Japan on 23 May 2012 and 35 U.S.C. §119(e) to U.S. Provisional application No. 61/651,791 filed on 25 May 2012, which are incorporated by reference.

BACKGROUND OF INVENTION

1. Field of Invention

The present invention relates to a gas generator for a restraining device such as an airbag system in a vehicle.

2. Description of Related Art

In a pyrotechnic type gas generator using a gas generating agent, the combustion performance can be adjusted and an amount of gas generated per unit time can be changed by adjusting one or more optional factors selected among a charging amount, a shape, dimensions, composition, and a composition ratio of the gas generating agent.

For example, in order to reduce the effect for the occupant, a method is implemented by which, in an airbag deployment, a gas generation amount is adjusted to a small volume at an initial stage of combustion and to a large volume in a later stage of combustion, thereby obtaining the so-called S-shaped output curve representing pressure variations in the generated gas with time, or a method is implemented by which a gas generation rate is reduced at a later stage of combustion after the airbag has been deployed, in order to maintain the deployed state thereof.

In a gas generator 10 described in JP-A No. 2006-168670, a combustion chamber is defined outside an inner tube 16 in a housing 11, and the combustion chamber is divided into two combustion chambers (a first combustion chamber 31 and a second combustion chamber 32) by a partitioning member 26.

The combustion gas generated in the first combustion chamber 31 passes through the second combustion chamber and reaches a gas discharge port 15 formed in the circumferential wall of the housing 11.

Since communication holes 17 and 18 formed in the inner tube 16 have different opening areas, the burn-up time differs among the gas generating agents in the combustion chambers and the gas is discharged in two stages.

SUMMARY OF INVENTION

The present invention provides a gas generator including:
a housing (13) including a top plate (11a), a bottom plate (12a) and a circumferential wall (11a, 12b) provided with a gas discharge port (14);
an inner cylindrical member (24) disposed inside the housing (13) and defining an ignition chamber (19) therein;
a space outside the inner cylindrical member (24) in the housing (13) being axially divided into two spaces by a partition member (60,65);
a first combustion chamber (30) charged with a first gas generating agent (32) and being formed in one of the two spaces, the first combustion chamber (30) being in communication with the ignition chamber (19) by a first communication nozzle (80) provided in the inner cylindrical member (24);
a second combustion chamber (40) charged with a second gas generating agent (42) and being formed in the other of the two spaces, the second combustion chamber (40) being in communication with the ignition chamber (19) by a second communication nozzle (82) provided in the inner cylindrical member (24);
a plenum chamber (50) located between the first combustion chamber (30) and the second combustion chamber (40), an inner side of the plenum chamber (50) facing the inner cylindrical member (24), an outer side of the plenum chamber (50) facing the circumferential wall (11a, 12b) provided with the gas discharge port (14),
the first combustion chamber (30) being in communication with the plenum chamber (50), and the second combustion chamber (40) being in communication with the plenum chamber (50),
an axial position of the first communication nozzle (80) being adjusted to be farther away from the plenum chamber (50), than an axial position of the second communication nozzle (82),
during actuation, the first gas generating agent (32) located in the first combustion chamber (30) to be burn up earlier than the second gas generating agent (42) located in the second combustion chamber (40).

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 1:
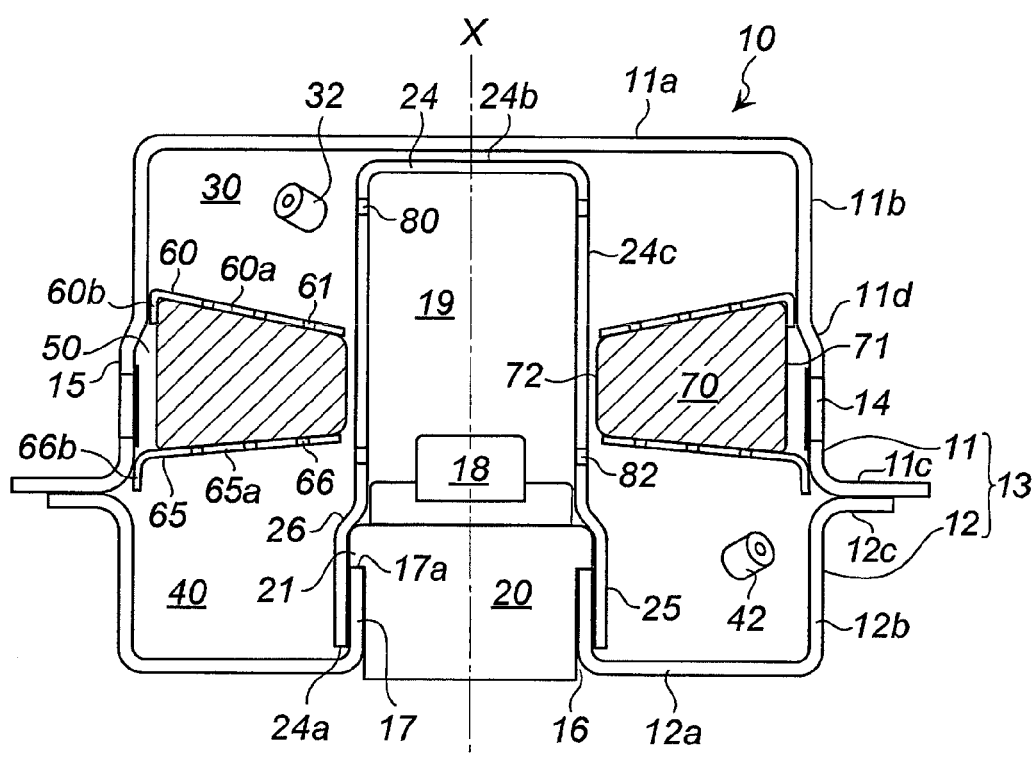
FIG. 1 shows an axial sectional view of the gas generator in accordance with the present invention.

The present invention provides a gas generator having two combustion chambers, i.e. a first combustion chamber charged with a first gas generating agent and a second combustion chamber charged with a second gas generating agent, the gas generator in which the first gas generating agent located in the first combustion chamber is adjusted to burn up earlier than the second gas generating agent located in the second combustion chamber, in order to obtain the output performance of various types corresponding to the function with high reproducibility.

Provided is a gas generator in which output performance of various types corresponding to functions can be implemented with good reproducibility.

A first combustion chamber and an ignition chamber are communicated by a first communication nozzle. A second combustion chamber and the ignition chamber are communicated by a second communication nozzle. The first communication nozzle is formed at a position further away from a plenum chamber than the second communication nozzle. During actuation, the first gas generating agent located in the first combustion chamber burns up earlier than a second gas generating agent located in the second combustion chamber.

In the gas generator according to the present invention, the interior of the housing on the outside of the inner cylindrical member is axially divided into two spaces by the plenum chamber, and the divided two spaces serve as the first combustion chamber and the second combustion chamber. Either of the first combustion chamber and the second combustion chamber may be arranged on the top plate side or the bottom plate side.

The interior of the inner cylindrical member serves as the ignition chamber and accommodates a known igniter and transfer charge (or gas generating agent).

The first combustion chamber and the ignition chamber are communicated with each other by the first communication nozzle formed in the inner cylindrical member, and the second combustion chamber and the ignition chamber are communicated with each other by the second communication nozzle formed in the inner cylindrical member.

Further, the axial positions of the first communication nozzle and second communication nozzle are adjusted such that the first communication nozzle is at a position farther from the plenum chamber than the second communication nozzle. By adjusting the number or a size of the first communication nozzles and the second communication nozzles, it is also possible to adjust a relationship in largeness between the total opening areas of the first communication nozzle and the second communication nozzle (for example, the total opening area of the first communication nozzle>the total opening area of the second communication nozzle).

The gas discharge port faces the interior of the plenum chamber.

Combustion products (flame, etc.) generated in the ignition chamber are released from the first communication nozzle and the second communication nozzle and cause ignition and burning of the first gas generating agent and second gas generating agent located in the first combustion chamber and the second combustion chamber, respectively.

The combustion gases generated from the respective combustion chambers enter the plenum chamber and are discharged from the gas discharge port.

In this case, because of the difference in positions in the axial direction between the first communication nozzle and the second communication nozzle, the first gas generating agent burns easier than the second gas generating agent. Therefore, the first gas generating agent in the first combustion chamber burns up earlier, and the second gas generating agent in the second combustion chamber burns up later.

Because of such a difference in burn-up time between the first gas generating agent in the first combustion chamber and the second gas generating agent in the second combustion chamber, the output performance of the gas generator as a whole can be adjusted to the desired state.

The interior of the plenum chamber may be empty or a filter may be disposed therein.

From the standpoint of adjusting the output performance in the above-described manner, it is preferred that the gas discharge port be formed, in the circumferential wall of the housing, within a height range of 20% to 80%, more preferably within a height range of 30% to 70%, even more preferably within a height range of 40% to 60% from the bottom plate with respect to the axial length of the housing (a length from the inner surface of the top plate to the inner surface of the bottom plate).

When the first combustion chamber is in the top plate side, it is preferred that the first communication nozzle be formed within a height range of 2% to 50%, more preferably within a height range of 2% to 35%, and even more preferably within a height range of 2% to 25% from the top plate with respect to the axial length of the housing inside the first combustion chamber (a maximum length in the axis X direction inside the first combustion chamber). It is preferred that the second communication nozzle be formed within a height range of 50% to 98%, more preferably within a height range of 65% to 98%, and even more preferably within a height range of 75% to 98% from the bottom plate with respect to the axial length of the housing inside the second combustion chamber (a maximum length in the axis X direction inside the second combustion chamber).

When the first combustion chamber is in the bottom plate side, it is preferred that the first communication nozzle be formed within a height range from the position facing the bottom plate to 50%, more preferably within a height range from the position facing the bottom plate to 35%, and even more preferably within a height range from the position facing the bottom plate to 25%, with respect to the axial length of the housing inside the first combustion chamber (a maximum length in the axis X direction inside the first combustion chamber). It is preferred that the second communication nozzle be formed within a height range of 50% to 98%, more preferably within a height range of 65% to 98%, and even more preferably within a height range of 75% to 98% from the top plate with respect to the axial length of the housing inside the second combustion chamber (a maximum length in the axis X direction inside the second combustion chamber).

It is preferable in the present invention, that the gas generator of the invention is provided, wherein the first combustion chamber is in a side of the top plate in the housing, and the second combustion chamber is in a side of the bottom plate in the housing, the first communication nozzle is formed in a circumferential wall of the inner cylindrical member in the vicinity of an end portion close to the top plate, and the second communication nozzle is formed in the circumferential wall of the inner cylindrical member at a position close to the plenum chamber.

It is also preferable in the present invention, that the gas generator of the invention is provided, wherein the first combustion chamber is in a side of the bottom plate in the housing, and the second combustion chamber is in a side of the top plate in the housing;

the first communication nozzle is formed between an opening side at one end of the inner cylindrical member and the bottom plate; and the second communication nozzle is formed in a circumferential wall of the inner cylindrical member at a position close to the plenum chamber.

In either of the above shown invention and preferable ones, the first gas generating agent located inside the first combustion chamber is burned up earlier and the second gas generating agent located in the second combustion chamber is burned up later.

It is also preferable in the present invention, that the gas generator of the invention is provided, wherein the partition member includes a combination of two substantially annular flat plate members disposed apart from each other in the axial direction, and the plenum chamber is an annular space formed between the two substantially annular flat-plate members.

Where the partition member is used that is formed by a combination of two annular substantially flat-plate members, the gas discharge port faces the interior of the plenum chamber and, therefore, a volume of the plenum chamber can be easily adjusted and volumes of the first combustion chamber and the second combustion chamber can be easily adjusted according thereto.

The positions of the first communication nozzle and the second communication nozzle formed in the inner cylindrical member can be also easily adjusted.

Instead of using the two annular substantially flat-plate members, it is possible to use a partition member in which an annular top surface, an annular bottom surface and an outer circumferential wall surface defining the plenum chamber are formed integrally and which has an opening in the outer circumferential wall surface facing the gas discharge port. Alternatively, it is possible to use a partition member in which an annular top surface, an annular bottom surface and an inner circumferential wall surface defining the plenum chamber are formed integrally.

It is also preferable in the present invention, that the gas generator of the invention is provided, wherein an axial length of an inner circumferential surface of the plenum chamber on a side facing the inner cylindrical member is less than an axial length of an outer circumferential surface of the plenum chamber on a side facing the circumferential wall of the housing.

With such a configuration, the first communication nozzle or the second communication nozzle can be formed, on the inner cylindrical member, within a wide range in the axial direction of the housing.

It is also preferable in the present invention, that the gas generator of the invention further includes:

a filter disposed in the plenum chamber such that a gap is formed between an outer circumferential surface of the filter and an inner circumferential surface of the circumferential wall of the housing.

The gap facilitates the penetration of gas through the entire filter. Further, where the axial length on the outer circumferential surface side of the filter is increased over that on the inner circumferential surface side of the filter to match the shape of the plenum chamber, a larger amount of the combustion gas flows through the portion of the filter close to the gas discharge port. Therefore, the gas flow inside the filter is facilitated.

It is also preferable in the present invention, that the gas generator of the invention is provided, wherein one or more factors, selected among a charging amount, a shape, dimensions, composition, and a composition ratio of the first gas generating agent and the second gas generating agent, are adjusted as auxiliary means for ensuring that, during actuation, the first gas generating agent located in the first combustion chamber is burned up earlier than the second gas generating agent located in the second combustion chamber.

In the gas generator in accordance with the present invention, the burn-up time of the first gas generating agent located in the first combustion chamber and the second gas generating agent located in the second combustion chamber is adjusted by the difference in height positions, in the axial direction, of the first communication nozzle and the second communication nozzle in each combustion chamber.

Further, the adjustment of the burn-up time can be supplemented and controlled by adjusting one or more factors selected among a charging amount, a shape, dimensions, composition, and a composition ratio of the first gas generating agent and the second gas generating agent.

The factors selected among a charging amount, a shape, dimensions, composition, and a composition ratio are presented below. The factors relating to (a) to (e) below can be reversed.

(a) A charging amount of the first gas generating agent is made less than that of the second gas generating agent.

(b) The first gas generating agent is shaped to facilitate the burning thereof (a shape with a large total surface area), and the second gas generating agent is shaped to delay the burning thereof (a shape with a small total surface area).

(c) Dimensions of the first gas generating agent are decreased (a shape with a large total surface area), and dimensions of the second gas generating agent are increased (a shape with a small total surface area).

(d) Composition (a combination of components) of the first gas generating agent is selected to facilitate the burning thereof, and composition (a combination of components) of the second gas generating agent is selected to delay the burning thereof.

(e) A composition ratio (a compounding ratio of components) of the first gas generating agent is selected to facilitate the burning thereof, and a composition ratio (a compounding ratio of components) of the second gas generating agent is selected to delay the burning thereof.

For example, where the factor (a) is met, a gas generator can be obtained in which at the initial stage of combustion, an amount of generated gas is small because a small amount of the first gas generating agent is burned up, but at the later stage, a high output is obtained because a large amount of the second gas generating agent is burned up with a delay.

For example, by reversing the factor (a), the initial stage can be set such that a large amount of the first gas generating agent is burned up, thereby increasing the initial output. However, in such a case, the adjustment is performed such that the first gas generating agent located in the first combustion chamber is burned up, during actuation, earlier than the second gas generating agent located in the second combustion chamber.

In the gas generator in accordance with the present invention, the settings are such that the burn-up time of the first gas generating agent located in the first combustion chamber is shorter, and the burn-up time of the second gas generating agent located in the second combustion chamber is longer.

Therefore, an output of the gas generator is easy to adjust, and a gas generator with good reproducibility can be obtained.

Embodiments of Invention (1) Gas Generator Shown in FIG. 1

A gas generator 10 has a housing 13 formed by a diffuser shell 11 and a closure shell 12.

A flange 11c of the diffuser shell and a flange 12c of the closure shell are overlapped and integrated by welding.

In the diffuser shell 11, a top plate 11a, a circumferential wall 11b provided with a gas discharge port 14, and the flange 11c protruding radially outward from the lower end of the circumferential wall 11b are formed integrally.

An enlarged-diameter portion 15 which is enlarged radially outward, with an annular step 11d serving as a boundary, is formed in the circumferential wall 11b of the diffuser shell 11.

The gas discharge port 14 is formed in the enlarged-diameter portion 15 and closed with a seal tape from the inner side.

The gas discharge port 14 is formed within a height range of 40% to 60% from the bottom plate side with respect to the axial length of the housing (the length from the inner surface of the top plate 11a to the inner surface of a bottom plate 12a).

In the closure shell, the bottom plate 12a having a hole 16 in the center, a circumferential wall 12b, and a flange 12c protruding radially outward from the upper end of the circumferential wall 12b are formed integrally.

A cylindrical portion 17 folded to the inner side of the housing 13 from the bottom plate 12a is formed at the hole 16.

A known electric igniter 18 is fixed to a metallic igniter collar 20 and disposed in the hole 16.

The igniter collar 20 has an annular flange 21 protruding radially outward, and the flange 21 is abutted against a tip circumferential edge 17a of the cylindrical portion 17.

The inner circumferential surface of the cylindrical portion 17 is abutted against the outer circumferential surface of the igniter collar 20, and the igniter collar 20 is fixed in this state to the cylindrical portion 17 by a known method such as welding.

An inner cylindrical member 24 is disposed in the central section of the housing 13, and the interior of the inner cylindrical member serves as an ignition chamber 19.

One end of the inner cylindrical member 24 is open (open end 24a), and the inner cylindrical member covers by the igniter 18 (the igniter collar 20) from the open end 24a side.

The opposite end of the inner cylindrical member 24 is closed with a closed end surface 24b. The closed end surface 24b may be a separate member such as a lid, and when the interior of the ignition chamber 19 is charged with a transfer charge (a gas generating agent), the ignition chamber is closed with the lid after the transfer charge has been loaded.

The closed end surface 24b may be abutted against the top plate 11a, or a gap may be formed therebetween, as shown in the drawing. Where the gap is present, it is preferred that the gas generating agent be of a size such as not to clog the gap.

The circumferential wall 24c of the inner cylindrical member 24 has an enlarged-diameter portion 25 in which the diameter is enlarged, with a step 26 serving as a boundary, in the open end 24a side.

The inner cylindrical member 24 is attached inside the housing 13 such that the step 26 is abutted against the flange 21 of the igniter collar 20, and the enlarged-diameter portion 25 is positioned on the outside of the cylindrical portion 17. The enlarged-diameter portion 25 and the cylindrical portion 17 are fixed by a known method such as welding.

In the space outside the inner cylindrical member 24, a first combustion chamber 30 is formed on the top plate 11a side and a second combustion chamber 40 is formed on the bottom plate 12a side by a partition member including a first substantially annular flat-plate member 60 and a second substantially annular flat-plate member 65.

A plenum chamber 50, defined by the first substantially annular flat-plate member 60, the second substantially annular flat-plate member 65, the circumferential wall 11b, and the inner cylindrical member 24, is formed between the first combustion chamber 30 and the second combustion chamber 40.

The first combustion chamber 30 is charged with a first gas generating agent 32, and the second combustion chamber 40 is charged with a second gas generating agent 42.

The first gas generating agent 32 and the second gas generating agent 42 have the same charging amount, shape, dimensions, composition, and composition ratio. Therefore, in the gas generator 10 shown in FIG. 1, it is preferable in the present invention that the volume of the first combustion chamber 30 is made equal to the volume of the second combustion chamber 40, or the volume of the first combustion chamber 30 is reduced.

The first combustion chamber 30 and the ignition chamber 19 are communicated with each other by a first communication nozzle 80 formed in the circumferential wall 24c of the inner cylindrical member 24.

The first communication nozzle 80 is formed in the circumferential wall 24c of the inner cylindrical member 24 so as to offset, or be located close, to the closed end surface 24b (at a position remote from the plenum chamber 50 in the X-axis direction).

The first communication nozzle 80 is not closed with a seal tape, but may be closed with a seal tape in order to prevent the transfer charge located inside the ignition chamber 19 from getting out into the first combustion chamber 30, or in order to prevent the first gas generating agent 32 from getting into the ignition chamber 19.

When the first communication nozzle 80 is closed with a seal tape, the first combustion chamber and the ignition chamber are not communicated with each other prior to actuation, but are communicated with each other during actuation. But since the seal tape is not required to have pressure resistance and endurance such as necessary for the seal tape sealing the gas discharge port 14 from the inside, in the present invention, the first combustion chamber 30 and the ignition chamber 19 are assumed to be communicated by the first communication nozzle 80 even when the first communication nozzle 80 is closed with the seal tape.

The second combustion chamber 40 and the ignition chamber 19 are communicated, at the time of actuation, by a second communication nozzle 82 formed in the circumferential wall 24c of the inner cylindrical member 24.

The second communication nozzle 82 is formed in the circumferential wall 24c of the inner cylindrical member 24 so as to offset to the plenum chamber 50 (at a position close to the plenum chamber 50 in the X-axis direction).

The second communication nozzle 82 is not closed with a seal tape, but may be also closed with a seal tape in the same manner as the above-described first communication nozzle 80.

The position of the first communication nozzle 80 in the axial X direction is further away from the plenum chamber 50 than the position of the second communication nozzle 82 in the axial X direction.

The first communication nozzle 80 is formed within a height range of 2% to 50% from the top plate with respect to the axial length of the housing (the maximum length in the axis X direction inside the first combustion chamber) in the first combustion chamber.

The second communication nozzle 82 is formed within a height range of 50% to 98% from the bottom plate with respect to the axial length of the housing (the maximum length in the axis X direction inside the second combustion chamber) in the second combustion chamber.

The first communication nozzle 80 may be also formed in the closed end surface 24b or in the corner which is the boundary of the closing end surface 24b and the circumferential wall 24c, provided that the present invention can be attained.

The plenum chamber 50 is formed by a combination of the first substantially annular flat-plate member 60 and the second substantially annular flat-plate member 65, and the gas discharge port 14 faces the interior of the plenum chamber 50.

The first substantially annular flat-plate member 60 includes a circular plate 60a provided with a through hole 61 and an annular wall 60b extended (bent) from the outer circumferential edge of the circular plate toward the bottom plate 12a. The annular wall 60b is press-inserted to the circumferential wall 11b of the diffuser shell 11.

The inner circumferential edge of the first substantially annular flat-plate member 60 faces the inner cylindrical member 24 with a gap formed therebetween so as not for the first gas generating agent 32 to be clogged.

The second substantially annular flat-plate member 65 includes a circular plate 65a provided with a through hole 66 and an annular wall 66b extended (bent) from the outer circumferential edge of the circular plate toward the bottom plate 12a. The annular wall 66b is press-inserted to the enlarged-diameter portion 15 of the diffuser shell 11.

The inner circumferential edge of the second annular substantially flat-plate member 65 faces the inner cylindrical member 24 with a gap formed therebetween so as not for the second gas generating agent 42 to be clogged.

The first combustion chamber 30 and the plenum chamber 50 are communicated with each other by the through hole 61, and the second combustion chamber 40 and the plenum chamber 50 are communicated with each other by the through-hole 66.

The circular plate 60a is mounted to be inclined downward toward the inner cylindrical member 24 with respect to the axis X passing through the center of the housing 13.

The circular plate 65a is mounted to be inclined upward toward the inner cylindrical member 24 with respect to the axis X passing through the center of the housing 13.

Therefore, the axial length of the plenum chamber 50 in the side that faces the inner cylindrical member 24 is less than the axial length of the plenum chamber in the side that faces the housing circumferential wall 11b, and a wide range for forming the first communication nozzle 80 and the second communication nozzle 82 in the axis X direction can be obtained.

An annular filter 70 is disposed inside the plenum chamber 50.

An outer circumferential surface 71 of the filter 70 is disposed at a distance from the inner circumferential surface (the gas discharge port 14) of the enlarged-diameter portion 15, and the inner circumferential surface 72 of the filter 70 is disposed to face the circumferential wall 24c of the inner cylindrical member 24. The inner circumferential surface 72 may be abutted against the circumferential wall 24c.

The annular wall 60b of the first substantially annular flat-plate member 60 is abutted against the outer circumferential surface 71 of the filter, thereby positioning the filter 70 inside the plenum chamber 50.

The filter 70 is shaped such that the cross-sectional shape thereof in the axis X direction matches the inner shape of the plenum chamber 50.

The operation of the gas generator 10 shown in FIG. 1 is explained below.

Where the igniter 18 is actuated by an ignition current, a transfer charge (not shown in the drawing) of the ignition chamber 19 is burned.

The combustion products (high-temperature gas, flame, etc.) are generated, pass through the first communication nozzle 80 and the second communication nozzle 82, and ignite the first gas generating agent 32 of the first combustion chamber 30 and the second gas generating agent 42 of the second combustion chamber 40, thereby generating combustion gas.

The combustion gas generated in the first combustion chamber 30 passes through the through-hole 61 of the first substantially annular flat-plate member 60, flows into the plenum chamber 50 and then passes through the filter 70 where the gas is cooled and purified. The gas then breaks the seal tape closing the gas discharge port 14 and is discharged outside the housing 13.

The combustion gas generated in the second combustion chamber 40 passes through the through-hole 66 of the second substantially annular flat-plate member 65, flows into the plenum chamber 50, and then passes through the filter 70 where the gas is cooled and purified. The gas is then discharged outside the housing 13.

In this case, since the first communication nozzle 80 is formed in the circumferential wall 24c of the inner cylindrical member 24, in a portion offset to the closed end surface 24b (at a position remote from the plenum chamber 50 in the axis X direction), the combustion products that have passed through the first communication nozzle 80 initially ignite the first gas generating agent 32 located in the vicinity of the first communication nozzle 80.

The combustion gas generated therefrom flows in the direction of the plenum chamber 50, which is the direction to outlet of the first combustion chamber 30 and has the unburned first gas generating agent present thereabout.

In other words, the combustion of the first gas generating agent 32 advances inside the first combustion chamber 30 from the top plate 11a side toward the plenum chamber 50 side.

Since the plenum chamber 50 that is connected to the gas discharge port 14 is present in the combustion advancement direction, the combustion of the entire first gas generating agent 32 is rapidly advanced and the time from the start to the end of combustion (burn-up time) is shortened.

Meanwhile, since the second communication nozzle 82 is formed at a position in the circumferential wall 24c of the inner cylindrical member 24 that is close to the plenum chamber 50 (at a position remote from the bottom plate 12a in the axis X direction), the combustion products that have passed through the second communication nozzle 82 initially ignite the second gas generating agent 42 located in the vicinity of the second communication nozzle 82.

The combustion gas generated therefrom flows in the direction of the plenum chamber 50 connected to the outlet (gas discharge port 14) of the second combustion chamber 40.

However, the unburned second gas generating agent 42 remains inside the second combustion chamber 40 at a position opposite to the plenum chamber 50 (in the bottom plate 12a side), that is, at a position opposite to the flow direction of the combustion gas.

In other words, for the second gas generating agent 42, the direction in which the combustion advances (from the plenum chamber 50 side toward the bottom plate 12a side in the axis X direction) is opposite to the flow direction of the combustion gas (toward the plenum chamber 50 side in the axis X direction) inside the second combustion chamber 40, and even though the second gas generating agent 42 is the same as the first gas generating agent 32, the burn-up time as a whole extends.

Therefore, the time required to burn up the first gas generating agent 32 is shorter and the time required to burn up the second gas generating agent 42 is longer, which makes it possible to adjust the output by using the difference therebetween.

In the gas generator shown in FIG. 1, when the first gas generating agent 32 and the second gas generating agent 42 start burning at the same time, the ratio of the combustion gas from the first gas generating agent 32 is initially larger in the discharged combustion gas.

Then, even when the first gas generating agent 32 is burned up, the second gas generating agent 42 continues to burn and the discharge of the combustion gas is continued.

Therefore, when the gas generator in accordance with the present invention is assembled in an airbag apparatus for a vehicle, at the initial stage of airbag deployment, the airbag is rapidly deployed by the combustion gas from the first gas generating agent 32, and then the combustion gas from the second gas generating agent 42 is added and a sufficient deployment pressure is obtained.

Further, in the gas generator in accordance with the present invention, an amount of each gas generating agent and combustion end time can be adjusted and a variety of gas generation modes can be achieved according to a purpose. For example, the output at the initial stage of actuation can be reduced to lessen the impact of the deployed airbag on the occupant, or gas can be supplied to maintain the internal pressure of the bag after the airbag deployment.

Further, by adjusting the number and size of the first communication nozzle 80 and the second communication nozzle 82, that is, by adjusting a relationship in largeness between the total opening areas of the first communication nozzle and the second communication nozzle, it is possible to adjust the burn-up time of the first gas generating agent 32 and the second gas generating agent 42.

As an auxiliary means, the burn-up time of the first gas generating agent 32 and the second gas generating agent 42 may be also adjusted by appropriately combining the above-described conditions (a) to (e) and the conditions obtained by reversing the conditions (a) to (e).

Figure 2:
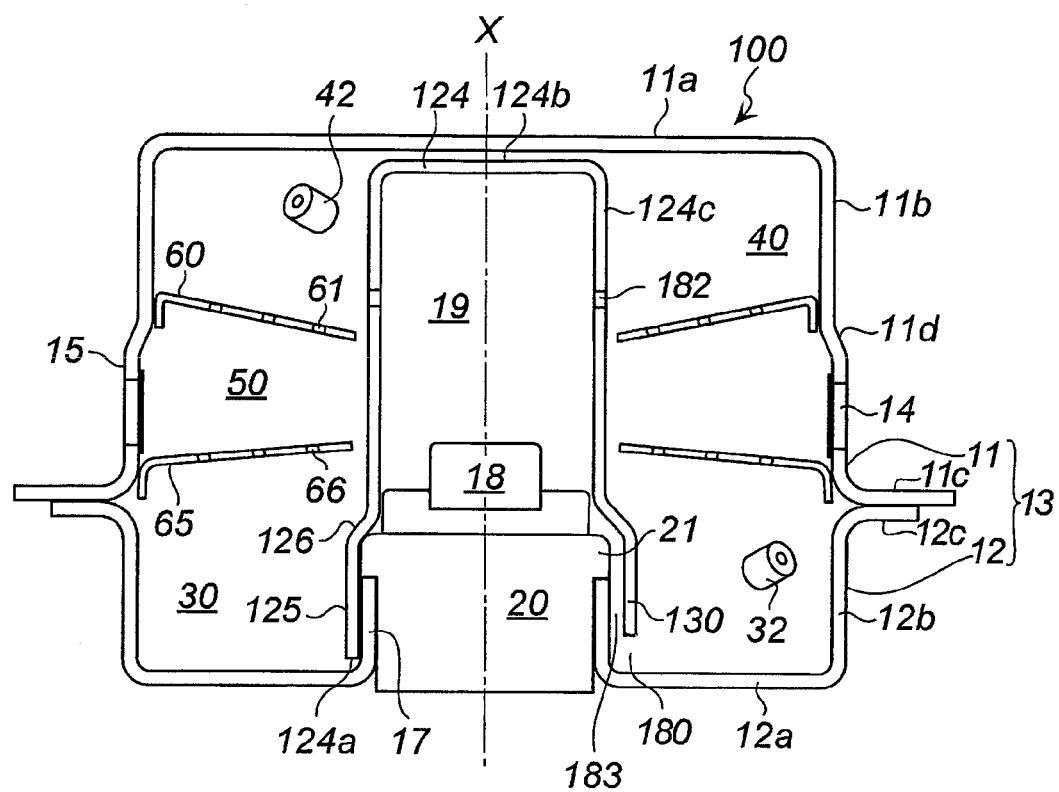
FIG. 2 shows an axial sectional view of the gas generator of another embodiment of the present invention.

(2) Gas Generator Shown in FIG. 2

A gas generator 100 shown in FIG. 2 is the same as the gas generator 10 shown in FIG. 1, except that the positions of the first communication nozzle 80 and the second communication nozzle 82 in the gas generator 10 shown in FIG. 1 are different. Further, the local shape of the inner cylindrical member 24 is different due to the difference in the position of the first communication nozzle, and the positions of the first combustion chamber and the second combustion chamber are reversed.

In the gas generator 100 shown in FIG. 2, the first combustion chamber 30 is formed in the bottom plate 12a side and the second combustion chamber 40 is formed in the top plate 11a side so as to sandwich the plenum chamber 50.

In the gas generator 100 shown in FIG. 2, the interior of the plenum chamber 50 is an empty space (no filter is disposed therein), but a filter can be also disposed therein in the same manner as in the gas generator 10 shown in FIG. 1.

One end of an inner cylindrical member 124 is open (open end 124a), and the open end 124a covers the igniter 18 (the igniter collar 20).

The opposite end of the inner cylindrical member 124 is closed with a closed end surface 124b. The closed end surface 24b may be a separate member such as a lid, and when the interior of the ignition chamber 19 is charged with a transfer charge (a gas generating agent), the ignition chamber is closed with the lid after the agent has been charged.

A circumferential wall 124c of the inner cylindrical member 124 has an enlarged-diameter portion 125 in which the diameter is enlarged, with a step 126 serving as a boundary, in the open end 124a side.

The inner cylindrical member 124 is attached inside the housing 13 such that the step 126 is abutted against a flange 21 of the igniter collar 20, and the enlarged-diameter portion 125 is positioned on the outside of the cylindrical portion 17. The enlarged-diameter portion 125 and the cylindrical portion 17 are fixed by a known method such as welding.

Figure 3:
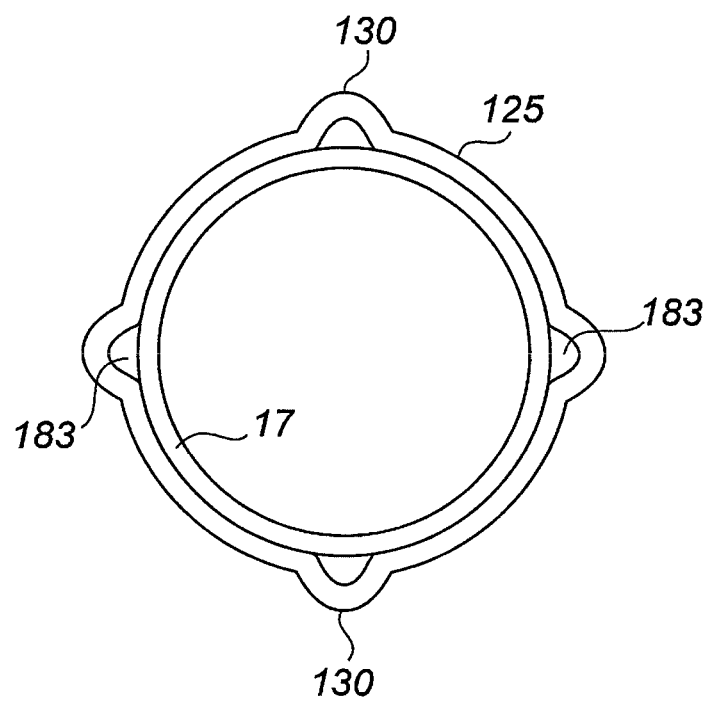
FIG. 3 is a partial sectional view in the radial direction for explaining the first communication nozzle in the gas generator shown in FIG. 2.

As shown in FIGS. 2 and 3, the inner cylindrical member 124 has a plurality of rib-shaped protrusions 130 formed over the entire length of the enlarged-diameter portion 125 in the axis X direction.

The rib-shaped protrusion 130 starts from the portion that is closer, than the step 126, to the closed end surface 124b and extends to the open end 124a.

The inner wall surface of the enlarged-diameter portion 125 where the rib-shaped protrusion 130 is not formed is abutted against the outer wall surface of the cylindrical portion 17 and the flange 21. In the portion where the rib-shaped protrusion 130 is formed, a continuous gap (a communication passage 183) is formed in the axis X direction between the outer circumferential surface of the cylindrical portion 17 and the rib-shaped protrusion 130.

The open end 124a where the rib-shaped protrusion 130 has been formed is cut off and a gap is formed between the rib-shaped protrusion and the bottom plate 12a. This gap serves as a first communication nozzle 180.

In the circumferential wall 124c of the inner cylindrical member 124, a second communication nozzle 182 communicating with the second combustion chamber 40 is formed close to the plenum chamber 50 in the axis X direction.

The operation of the gas generator 100 shown in FIG. 2 is explained below.

Where the igniter 18 is actuated by an ignition current, a transfer charge (not shown in the drawing) in the ignition chamber 19 is burned.

The combustion products (high-temperature gas, flame, etc.) are generated, pass through the first communication nozzle 180 and the second communication nozzle 182, and ignite the first gas generating agent 32 in the first combustion chamber 30 and the second gas generating agent 42 in the second combustion chamber 40, thereby generating combustion gas.

The combustion gas generated in the first combustion chamber 30 passes through the communication hole 66 of the second substantially annular flat-plate member 65, flows into the plenum chamber 50 and then breaks the seal tape closing the gas discharge port 14 and is discharged to the outside of the housing 13.

The combustion gas generated in the second combustion chamber 40 passes through the communication hole 61 in the first substantially annular flat-plate member 60, flows into the plenum chamber 50, and then passes through the filter 70 where the gas is cooled and purified. The gas is then discharged to the outside of the housing 13.

In this case, since the first communication nozzle 180 is formed at a position facing the bottom plate 12a, the first gas generating agent 32 starts burning around the first communication nozzle 180 and the combustion advances from the bottom plate 12a to the plenum chamber 50. As a result, the generated combustion gas also flows to the plenum chamber 50.

Therefore, inside the first combustion chamber 30, the unburned first gas generating agent 32 is present in the direction to which the combustion gas flows, the first gas generating agent as a whole burns up rapidly, and the time from the start to the end of combustion (burn-up time) is short.

Meanwhile, since the second communication nozzle 182 is formed in the circumferential wall 124c of the inner cylindrical member 124 at a position close to the plenum chamber 50 (at a position remote from the top plate 11a in the axis X direction), the combustion products that have passed through the second communication nozzle 182 initially ignite the second gas generating agent 42 located in the vicinity of this nozzle 182.

The combustion gas generated therefrom flows in the direction of the plenum chamber 50 connected to the outlet (the gas discharge port 14) of the second combustion chamber 40.

However, the unburned second gas generating agent 42 remains inside the second combustion chamber 40 at a position opposite to the plenum chamber 50 (in the top plate 11a side) that is, at a position opposite to the flow direction of the combustion gas.

In other words, for the second gas generating agent 42, the direction to which the combustion advances (from the plenum chamber 50 toward the top plate 11a in the axis X direction) is opposite to the flow direction of the combustion gas (toward the plenum chamber 50 in the axis X direction) inside the second combustion chamber 40, and even through the second gas generating agent 42 is the same as the first gas generating agent 32, the burn-up time as a whole extends.

Therefore, the gas generator 100 shown in FIG. 2 operates in the same manner as the gas generator 10 shown in FIG. 1.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator comprising:
   a housing including a top plate, a bottom plate and a circumferential wall provided with a gas discharge port;
   an inner cylindrical member disposed inside the housing and defining an ignition chamber therein;
   a space outside the inner cylindrical member in the housing being axially divided into two spaces by a partition member;
   a first combustion chamber charged with a first gas generating agent and being formed in one of the two spaces, the first combustion chamber being in communication with the ignition chamber by a first communication nozzle provided in the inner cylindrical member;
   a second combustion chamber charged with a second gas generating agent and being formed in the other of the two spaces, the second combustion chamber being in communication with the ignition chamber by a second communication nozzle provided in the inner cylindrical member;
   a plenum chamber located between the first combustion chamber and the second combustion chamber, an inner side of the plenum chamber facing the inner cylindrical member, an outer side of the plenum chamber facing the circumferential wall provided with the gas discharge port,
   the first combustion chamber being in communication with the plenum chamber, and the second combustion chamber being in communication with the plenum chamber,
   an axial position of the first communication nozzle being adjusted to be farther away from the plenum chamber, than an axial position of the second communication nozzle,
   during actuation, the first gas generating agent located in the first combustion chamber to be burn up earlier than the second gas generating agent located in the second combustion chamber.

2. A gas generator according to claim 1, wherein
   the first combustion chamber is in a side of the top plate in the housing, and the second combustion chamber is in a side of the bottom plate in the housing,
   the first communication nozzle is formed in a circumferential wall of the inner cylindrical member in the vicinity of an end portion close to the top plate, and
   the second communication nozzle is formed in the circumferential wall of the inner cylindrical member at a position close to the plenum chamber.

3. A gas generator according to claim 1, wherein
   the first combustion chamber is in a side of the bottom plate in the housing, and the second combustion chamber is in a side of the top plate in the housing;
   the first communication nozzle is formed between an opening side at one end of the inner cylindrical member and the bottom plate; and
   the second communication nozzle is formed in a circumferential wall of the inner cylindrical member at a position close to the plenum chamber.

4. A gas generator according to claim 1, wherein
   the partition member includes a combination of two substantially annular flat plate members disposed apart from each other in the axial direction, and
   the plenum chamber is an annular space formed between the two substantially annular flat-plate members.

5. A gas generator according to claim 1, wherein
   an axial length of an inner circumferential surface of the plenum chamber on a side facing the inner cylindrical member is less than an axial length of an outer circumferential surface of the plenum chamber on a side facing the circumferential wall of the housing.

6. A gas generator according to claim 1, further comprising:
   a filter disposed in the plenum chamber such that a gap is formed between an outer circumferential surface of the filter and an inner circumferential surface of the circumferential wall of the housing.

7. A gas generator according to claim 1, wherein
   one or more factors, selected among a charging amount, a shape, dimensions, composition, and a composition ratio of the first gas generating agent and the second gas generating agent, are adjusted as auxiliary means for ensuring that, during actuation, the first gas generating agent located in the first combustion chamber is burned up earlier than the second gas generating agent located in the second combustion chamber.

* * * * *